though somewhat ignoring the small content of the lanthanide-containing material of this and the following examples below

United States Patent Office 3,525,698
Patented Aug. 25, 1970

3,525,698
CERIUM AND LANTHANIDE ACTIVATED ALKALINE EARTH METAL PHOSPHATE PHOSPHORS
Joseph Reder Leto and David Neil Travis, Stamford, Conn., and Marilyn Judith Burger, New York, N.Y., assignors to American Cyanamid Company, Stamford, Conn., a corporation of Maine
No Drawing. Filed Oct. 20, 1967, Ser. No. 676,736
Int. Cl. C09k 1/36
U.S. Cl. 252—301.4                 10 Claims

ABSTRACT OF THE DISCLOSURE

Cerium activated alkaline earth metal phosphates, such as calcium, strontium or barium phosphates, are further activated with certain lanthanide ions and preferably also alkali metal ions and fired in the customary manner to produce phosphors. These phosphors fluoresce in narrow bands corresponding to the particular lanthanide ion. The phosphors may be represented by the following general formula:

$$[M^{2+}_{1-2(x+y)}Ce^{3+}_{x}Ln^{3+}_{y}Z^{1+}_{(x+y)}]_3(PO_4)_2$$

where $M^{2+}$ is an alkaline earth metal ion, $Ln^{3+}$ is a lanthanide ion selected from the group consisting of terbium dysprosium, thulium, samarium and neodymium, $Z^{1+}$ is an alkali metal ion and $x$ and $y$ are small decimal fractions.

BACKGROUND OF THE INVENTION

Cerium activated calcium phosphate phosphors are well known, for example, those also containing manganese as an activator which fluoresce over a moderately wide band in the deep red. It has also been proposed to add some sodium phosphate, which increases the brightness of fluorescence by a mechanism which has been postulated as charge compensation. Ordinary calcium phosphate has also been activated with cerium and with some thorium, which enhances the intensity of the fluorescence, which is in the long wave ultraviolet and short wave visible. All of these phosphors are produced by co-precipitating the particular phosphates and then firing, generally between 1200° and 1300° C., under conditions which do not change the oxidation of the cerium, for example in atmospheres of hydrogen and steam and the like. These phosphors all fluoresce in fairly broad bands, which is desirable for many uses, such as for example in fluorescent lamps, for lamps for making blueprints, and the like. There has remained, however, a need for narrow band phosphors for various purposes, such as coded inks and the like.

SUMMARY OF THE INVENTION

The present invention produces narrow band fluorescing materials comprising, cerium activated alkaline earth metal phosphates containing certain particular lanthanide ions with or without charge compensation by alkali metal ions such as sodium. The phosphors are not limited to calcium phosphates but include also phosphors which contain strontium or barium phosphates. Fluorescence is in narrow bands centered about a wavelength which is determined by the particular lanthanide ion present. The alkali metal ion produces enhanced luminescence of the lanthanide ion.

The phosphors may be represented by the following formula:

$$[M^{2+}_{1-2(x+y)}Ce^{3+}_{x}Ln^{3+}_{y}Z^{1+}_{(x+y)}]_3(PO_4)_2$$

The activation by cerium is with the $Ce^{3+}$. As in the case with the known cerium activated calcium phosphate phosphors, firing of the phosphor should be effected at high temperatures, for example between 1200° and 1300° C., under conditions which do not change the charge on the cerium, for example atmospheres of hydrogen and steam, preferably with some additional inert gases, such as argon. In this respect the phosphors of the present invention are produced in a similar manner to the calcium phosphates which have been described above and which are known.

Not all lanthanide compounds are useful in the present invention, which is limited to terbium, dysprosium, thulium, samarium and neodymium, the latter two being relatively less efficient as phosphors, but the neodymium has the property of fluorescing in a narrow band in the near infrared and for certain purposes is included. It is not known why other lanthanides are not useful, and particularly it is quite surprising that one of the most active lanthanide ions, namely europium, does not give a phosphor under the present invention.

It is worthwhile mentioning that $YVO_4$, a common host material for lanthanide luminescers does not produce a phosphor when doped with terbium. In fact, practical and inexpensive terbium phosphors are limited to a very few types.

It is, therefore, not intended to limit the present invention to any particular theory of why only certain of the lanthanides are practically useful.

It is an advantage of the present invention that the exact proportions of the added lanthanides are not critical and that they are very small, ranging from as little as 0.5%, based on the alkaline earth metal ion, in the case of thulium, to about 5%. This is a very real practical advantage because the lanthanides are quite expensive, and the results of the present invention are therefore obtainable with such small amounts that the total cost of the phosphor is quite moderate.

DESCRIPTION OF THE PREFERRED EMBODIMENTS

The invention will be described in connection with the following specific examples, in which proportions are by weight unless otherwise specified.

Example 1

4.0148 grams of $Ca(NO_3)_2 \cdot 4H_2O$, 0.8684 gram of $Ce(NO_3)_3 \cdot 6H_2O$, and 0.4531 gram of $Tb(NO_3)_3 \cdot 6H_2O$ were dissolved together in 50 ml. of water. The solution was brought to the boiling point and a boiling solution of 41.6 grams of $(NH_4)_2HPO_4$ in 75 ml. of water was added thereto. The mixed phosphates which were so precipitated were digested in this boiling system for 15 minutes, and then collected by centrifugation, washed twice with water and dried overnight at 105° C. 1.005 grams of this white powdery solid was placed in a glazed porcelain boat and fired for 70 minutes at 1250° C. in a flowing atmosphere comprising 20% by volume of water-saturated argon gas and 80% hydrogen gas. The white solid remaining in the boat weighed 0.8432 gram, or about 84% by weight of the original charge. This material has the composition $Ca_3(PO_4)_2:Ce^{3+}$ (10%):$Tb^{3+}$ (5%), and emits a bright green fluorescence when irradiated with ultraviolet light of 313 mμ wavelength.

Example 2

Following the general procedure of Example 1, 4.4396 grams of $Ca(NO_3)_2 \cdot 4H_2O$, 0.4342 gram of $$Ce(NO_3)_3 \cdot 6H_2O$$

and 0.0889 gram of $Sm(NO_3)_3 \cdot 6H_2O$ were co-precipitated as phosphates, washed, dried and fired at 1250° C. under argon/water/hydrogen to a white powdery solid of composition $Ca_3(PO_4)_2:Ce^{3+}$ (5%):$Sm^{3+}$ (1%) which emits a bright red-orange fluorescence when irradiated with the ultraviolet light.

Example 3

Following the procedure of Example 1, 3.7312 grams of $Ca(NO_3)_2 \cdot 4H_2O$, 1.7370 grams of $Ce(NO_3)_3 \cdot 6H_2O$, and 0.0879 of $Dy(NO_3)_3 \cdot 6H_2O$, were co-precipitated as phosphate, washed, dried and fired at 1250° C. under $Ar/H_2O/H_2$ to a powdery white solid of composition $Ca_3(PO_4)_2:Ce^{3+}(20\%):Dy^{3+}(1\%)$ which emits a bright yellow fluorescence when irradiated with ultraviolet light.

Example 4

Following the procedure of Example 1, 3.0985 grams $Ca(NO_3)_2 \cdot 4H_2O$, 0.8684 gram of $Ce(NO_3)_3 \cdot 6H_2O$ and 0.3587 gram of $Nd(NO_3)_3 \cdot 6H_2O$ were co-precipitated as phosphates, washed, dried and fired to a powdery pale blue solid of composition $Ca_3(PO_4)_2:Ce^{3+}(10\%):Nd^{3+}(5\%)$ which fluoresces in the infrared when irradiated with ultraviolet light.

Example 5

3.3061 gram $Ca(NO_3)_2 \cdot 4H_2O$, 0.8684 gram $$Ce(NO_3)_3 \cdot 6H_2O$$

and 0.4530 gram $Tb(NO_3)_3 \cdot 6H_2O$ were co-precipitated and washed as in Example 1. The mixed phosphates were slurried in 100 ml. $H_2O$ with 0.3059 gram $NaPO_3$ until well mixed, and the whole was centrifuged and dried at 105° overnight to give 2.6239 grams of a powdery off-white solid. 1.6233 grams of this charge were placed in a porcelain boat and fired at 1250° C. for 70 minutes in a flowing atmosphere comprising 20 volume percent water-saturated argon and 80 volume percent hydrogen. The white solid remaining in the boat weighed 1.3247 grams, or 81% of the original charge. This material has the composition $Ca_3(PO_4)_2:Ce^{+3}(10\%):Tb^{+3}(5\%):Na^{+1}(15\%)$, and emits a green fluorescence when irradiated with ultraviolet light of 313 m$\mu$ wavelenth. The fluorescence from this material is about 1.6 times brighter than that from the related phosphor of Example 1 which has no sodium phosphate.

Example 6

Following the procedure of Example 5, 2.7394 grams of $Ca(NO_3)_2 \cdot 4H_2O$, 1.7370 grams of $Ce(NO_3)_3 \cdot 6H_2O$ and 0.0879 gram of $Dy(NO_3)_3 \cdot 6H_2O$ were co-precipitated as phosphates, washed, and slurried with 0.4282 gram of $NaPO_3$. After centrifugation and drying, the white powder was fired at 1250° in the $H_2/A/H_2O$ atmosphere for 70 minutes producing a white powdery product of composition $$Ca_3(PO_4)_2:Ce^{+3}(20\%):Dy^{+3}(1\%):Na^{+1}(21\%)$$

This material emits a bright yellow fluorescence when irradiated with ultraviolet light which is about 1.8 times the intensity of the related phosphor of Example 3 without $Na^+$.

Example 7

The procedure of Example 5 is repeated replacing the terbium nitrate with a stoichiometrically equivalent amount of thulium nitrate. The luminescence of the phosphor is a bright blue.

The characteristics of the phosphors of the preceding examples are summarized in the following table, in which Ln is used generically for the particular lanthanide ion.

It will be seen that the first three phosphors show excellent intensities and the last two, while much less efficient phosphors, are still useful for certain purposes, and the neodymium phosphor has the property of narrow band fluorescence in the near infrared, which for certain purposes is useful.

Example 8

Following the procedure of Example 5, 0.9822 gram of $Sr(NO_3)_2$, 0.2879 gram of $Ce(NO_3)_3 \cdot 6H_2O$ and 0.1502 gram of $Tb(NO_3)_3 \cdot 6H_2O$ were co-precipitated as phosphates with 3.72 grams of $(NH_4)_2HPO_4$, washed, and slurried with 0.1014 gram of $NaPO_3$. After centrifugation and drying at 105° C., the white powder weighed 1.1592 g. This charge was fired at 1250° in the $H_2/A/H_2O$ atmosphere for 70 minutes, producing 0.9249 g. of a white powdery product of composition $$Sr_3(PO_4)_2:Ce^{+3}(10\%):Tb^{+3}(5\%):Na^{+1}(15\%)$$

When irradiated with ultraviolet light, this material emits a bright green fluorescence.

Example 9

Following the procedure of Example 8 except that 1.2130 grams of $Ba(NO_3)_2$ were used in place of the $Sr(NO_3)_2$, a powdery white solid of composition $$Ba_3(PO_4)_2:Ce^{+3}(10\%):Tb^{+3}(5\%):Na^{+1}(15\%)$$

was produced. When irradiated with ultraviolet light, this material emits a bright green fluorescence similar to that of Example 8.

Example 10

1.4431 grams of $Ca(NO_3)_2$, 0.3791 gram of $$Ce(NO_3)_3 \cdot 6H_2O$$

and 0.1977 gram of $Tb(NO_3)_3 \cdot 6H_2O$ were co-precipitated as the phosphates with 4.90 grams of $(NH_4)_2HPO_4$, as described in Example 1. After washing, the co-precipitated material was slurried in water at 5° C. with 0.0505 gram of $Li_3PO_4$ and the mixture was isolated by centrifugation. After drying at 105° C. 1.0608 grams of this charge was fired at 1250° C. in the $H_2/A/H_2O$ atmosphere for 70 minutes, producing 0.9572 gram of a gray powdery material of composition $$Ca_3(PO_4)_2:Ce^{+3}(10\%):Tb^{+3}(5\%):Li^{+1}(15\%)$$

When irradiated with ultraviolet light, this material emits a bright green fluorescence.

We claim:

1. Phosphors consisting essentially of alkaline earth metal orthophosphates activated with $Ce^{3+}$ ions and from about 0.5% to about 5%, based on the alkaline earth metal ion, of an additional activating lanthanide ion selected from the group consisting of terbium, dysprosium, thulium, samarium, and neodymium in an amount less than the content of $Ce^{3+}$ ions, which phosphors on illumination by ultraviolet light photoluminesce in narrow bands in the visible or near infrared.

2. Phosphors according to claim 1 in which the activated phosphate is a calcium phosphate.

3. Phosphor according to claim 2 in which the additional activator is a terbium ion.

4. Phosphor according to claim 2 in which the additional activator is a dysprosium ion.

5. Phosphor according to claim 2 in which the additional activator is a thulium ion.

| Ex. | $Ca_3(PO_4)_2:Ce^{3+}$ (x percent): $Ln^{3+}$ (y percent) | | Wavelength of emitted [1] light (principal line) (m$\mu$) | Natural emission lifetime | Rel. intensity |
|---|---|---|---|---|---|
| | $Ln^{3+}$ | x | y | | | |
| 5 | Tb | 5 | 5 | 545 | 2 msec | 40 |
| 6 | Dy | 5 | 1 | 575 | 400 $\mu$sec | 16 |
| 7 | Tm | 5 | 0.5 | 450 | 5 $\mu$sec | 10 |
| 2 | Sm | 5 | 1 | 648 | 1.5 msec | 4 |
| 4 | Nd | 10 | 5 | 880 | 110 $\mu$sec | 6 |

[1] When activated by 3130 A. light.

6. Phosphor according to claim 2 in which the additional activator is a samarium ion.

7. Phosphor according to claim 2 in which the additional activator is a neodymium ion.

8. A phosphor according to claim 1 in which there is additionallly present in the crystal lattice an amount of an alkali metal ion approximately equivalent stoichiometrically equal to the sum of the lanthanide and cerium ions.

9. A process of preparing a phosphor according to claim 1 in which a solution of a mixture of alkaline earth metal salts, $Ce^{3+}$ salts, and from about 0.5% to about 5%, based on the alkaline earth metal ion, of a salt of a metal selected from the group consisting of terbium, dysprosium, thulium, samarium and neodymium are reacted with at least a stoichiometrical amount of a soluble orthophosphate to co-precipitate an orthophosphate of the metals, drying the co-precipitated phosphate and firing at a temperature between 1200° C. and 1300° C. under an atmosphere which does not change the charge on cerium atoms.

10. A process according to claim 9 in which the alkaline earth metal salt is a calcium salt.

References Cited

UNITED STATES PATENTS

| | | |
|---|---|---|
| 2,306,567 | 12/1942 | Roberts. |
| 2,455,413 | 12/1948 | Froelich et al. |
| 3,079,347 | 2/1963 | Garrett et al. _____ 252—301.4 |

TOBIAS E. LEVOW, Primary Examiner

R. D. EDMONDS, Assistant Examiner